(12) United States Patent
Hatton et al.

(10) Patent No.: US 9,491,563 B1
(45) Date of Patent: Nov. 8, 2016

(54) PRE-PROVISIONING MOBILE APPLICATION ACQUISITION AND UTILIZATION

(71) Applicant: Evolving Systems, Inc., Englewood, CO (US)

(72) Inventors: Eric Michael Hatton, South Gloucestershire (GB); Shreraam Gurumoorthy, Chennai (IN)

(73) Assignee: EVOLVING SYSTEMS, INC., Englewood, CO (US)

( * ) Notice: Subject to any disclaimer, the term of this patent is extended or adjusted under 35 U.S.C. 154(b) by 0 days.

(21) Appl. No.: 14/885,331

(22) Filed: Oct. 16, 2015

(51) Int. Cl.
| H04W 4/00 | (2009.01) |
| H04W 12/08 | (2009.01) |
| H04W 60/00 | (2009.01) |
| H04W 8/20 | (2009.01) |

(52) U.S. Cl.
CPC .............. *H04W 4/001* (2013.01); *H04W 8/205* (2013.01); *H04W 12/08* (2013.01); *H04W 60/00* (2013.01)

(58) Field of Classification Search
CPC ......... G06F 21/10; G06F 8/61; H04L 63/08; H04L 43/14; H04L 67/10; H04W 12/06; H04W 80/04; H04W 80/12
USPC ........................................... 455/432.1–435.1
See application file for complete search history.

(56) References Cited

U.S. PATENT DOCUMENTS

| 5,887,253 A | 3/1999 | O'Neil et al. |
| 5,943,620 A | 8/1999 | Boltz et al. |
| 6,014,561 A | 1/2000 | Mölne |
| 6,134,441 A | 10/2000 | Astrom et al. |
| 6,167,251 A | 12/2000 | Segal et al. |
| 6,226,517 B1 | 5/2001 | Britt et al. |
| 6,591,098 B1 | 7/2003 | Shieh et al. |

(Continued)

FOREIGN PATENT DOCUMENTS

| EP | 1703760 A2 | 9/2006 |
| KR | 10-2001-0033025 A | 4/2001 |

(Continued)

OTHER PUBLICATIONS

International Search Report and Written Opinion of PCT/US2008/082484 mailed on Jan. 7, 2009, 9 pages.

(Continued)

*Primary Examiner* — Ronald Eisner
(74) *Attorney, Agent, or Firm* — Kilpatrick Townsend & Stockton LLP

(57) ABSTRACT

A method of provisioning a wireless device for use with a wireless carrier network includes receiving an initial provisioning request that includes an identifier associated with the wireless device which is not yet authorized for use on the wireless carrier network beyond provisioning of the wireless device. A determination is made that the wireless device is data-ready. Data-ready wireless devices may be configured to download and execute mobile applications. The wireless device is provided with access to a download for a mobile application configured to provision the wireless device over the wireless carrier network when installed and executed by the wireless device. Registration information is received from the mobile application being executed by the wireless device via the wireless carrier network. The registration information is provided to a provider of the wireless carrier network for provisioning the wireless device on the wireless carrier network.

20 Claims, 9 Drawing Sheets

(56) References Cited

U.S. PATENT DOCUMENTS

| | | |
|---|---|---|
| 6,603,968 B2 | 8/2003 | Anvekar et al. |
| 6,680,601 B2 | 1/2004 | Wallgren |
| 6,836,651 B2 | 12/2004 | Segal et al. |
| 6,975,862 B1 | 12/2005 | Garland et al. |
| 7,197,301 B2 | 3/2007 | Netanel |
| 7,266,371 B1 | 9/2007 | Amin et al. |
| 7,274,928 B2 | 9/2007 | Netanel et al. |
| 7,289,805 B2 | 10/2007 | Tom et al. |
| 7,386,302 B2 | 6/2008 | Riffe et al. |
| 7,424,442 B2 | 9/2008 | Wong et al. |
| 7,444,148 B1 | 10/2008 | Cook |
| 7,991,394 B2 | 8/2011 | Gonen et al. |
| 8,145,212 B2 | 3/2012 | Lopresti et al. |
| 8,509,767 B2 | 8/2013 | Parsons et al. |
| 8,559,930 B2 | 10/2013 | Thorn et al. |
| 8,929,863 B2 | 1/2015 | Thorn et al. |
| 9,161,296 B2 | 10/2015 | Parsons et al. |
| 2001/0029182 A1 | 10/2001 | McCann et al. |
| 2002/0094808 A1 | 7/2002 | Tiedemann, Jr. et al. |
| 2002/0177440 A1 | 11/2002 | Mukherjee |
| 2003/0031305 A1 | 2/2003 | Netanel et al. |
| 2003/0119490 A1 | 6/2003 | Mohammed |
| 2003/0129948 A1 | 7/2003 | Gab et al. |
| 2003/0166398 A1 | 9/2003 | Netanel |
| 2004/0203572 A1 | 10/2004 | Aerrabotu et al. |
| 2005/0020234 A1 | 1/2005 | Iivari et al. |
| 2005/0181793 A1 | 8/2005 | Netanel |
| 2006/0035631 A1 | 2/2006 | White et al. |
| 2006/0143098 A1 | 6/2006 | Lazaridis |
| 2006/0205434 A1 | 9/2006 | Tom et al. |
| 2007/0300294 A1 | 12/2007 | Netanel et al. |
| 2008/0026740 A1 | 1/2008 | Netanel |
| 2008/0057935 A1 | 3/2008 | Netanel et al. |
| 2008/0081592 A1 | 4/2008 | Das et al. |
| 2008/0182553 A1 | 7/2008 | Salkini et al. |
| 2008/0220740 A1 | 9/2008 | Shatzkamer et al. |
| 2009/0011759 A1 | 1/2009 | Alperovich et al. |
| 2009/0025070 A1 | 1/2009 | Netanel et al. |
| 2009/0067408 A1 | 3/2009 | Leppainen et al. |
| 2009/0109987 A1 | 4/2009 | Kampmann et al. |
| 2009/0149175 A1 | 6/2009 | Lopresti et al. |
| 2009/0280776 A1* | 11/2009 | Chen .................. H04L 63/08 455/411 |
| 2010/0009659 A1 | 1/2010 | Netanel et al. |
| 2010/0159924 A1 | 6/2010 | Lagerman et al. |
| 2010/0273462 A1 | 10/2010 | Thorn et al. |
| 2012/0094633 A1 | 4/2012 | Parsons et al. |
| 2012/0094634 A1 | 4/2012 | Parsons et al. |
| 2012/0184274 A1 | 7/2012 | Lopresti et al. |

FOREIGN PATENT DOCUMENTS

| | | |
|---|---|---|
| KR | 10-2005-0033956 A | 4/2005 |
| KR | 10-2006-0135003 A | 12/2006 |
| WO | 00/21275 A1 | 4/2000 |
| WO | 01/60092 A3 | 8/2001 |
| WO | 02/058361 A2 | 7/2002 |
| WO | 02/058361 A3 | 7/2002 |
| WO | 08/118638 A1 | 10/2008 |

OTHER PUBLICATIONS

International Search Report PCT/US2010/032200 mailed on Nov. 30, 2010, 7pages.

International Search Report PCT/US2011/051456 mailed on Apr. 17, 2012, 7 pages.

International Search Report PCT/US2011/051464 mailed on Feb. 23, 2012, 8 pages.

* cited by examiner

PRE-PROVISIONING MOBILE APPLICATION ACQUISITION AND UTILIZATION

BACKGROUND OF THE INVENTION

When a user purchases a new wireless device, the user's wireless provider generally must activate the device before the user can use the device on the provider's network. There are several ways in which a wireless device can be activated. The wireless device may be preactivated prior to sale of the device to the user. Under a preactivation scheme, the device has installed therein a subscriber identity module (SIM) that is assigned an activated international mobile subscriber identity (IMSI) before the device is sold. This technique, while technically feasible, has several downsides. First, because the IMSI is assigned and activated before the device is sold, there is enhanced risk of theft and other supply-chain "leakage." Second, this technique requires substantial investment in allocating and activating IMSIs early in the supply chain, resulting in inefficiencies (for example, maintaining a relatively large stock of activated. IMSIs corresponding to devices that may not be sold or used for some time). Moreover, if the supply chain involves rebranding the devices, some of the allocated and activated IMSIs might never be used. Moreover, preactivation of a SIM generally requires the assignment of a Mobile Station International Subscriber Directory Number (MSISDN) to the SIM (by associating the MSISDN with the IMSI assigned to the SIM). Given that IMSIs (and, especially, MSISDNs) can be relatively scarce resources, this solution is less than optimal.

In some cases, the wireless device is activated at the point of sale. While this technique is suitable for applications in which the device is sold at a relatively sophisticated reseller or agent of the wireless provider, it is unavailable in many cases (including, for example, in the case of prepaid phones and/or other phones that are purchased at locations other than dedicated resellers).

Another option is to sell a wireless device in an unactivated state and require the user to activate the phone before using it. Typically, as the device is inoperable on the network until activation, the device itself cannot be used as the activation vehicle. Hence, the user will have to call the provider (using a different phone), visit the provider's website (using a separate computer or some other device), and/or the like. This option, while sometimes the only available option, is less than desirable because it can impose an inconvenience on the user, resulting in a competitive disadvantage for the provider in relation to techniques that do not impose this inconvenience on the user.

Moreover, existing techniques for activating wireless devices offer the user limited (if any) input into the phone number (e.g., MSISDN) that the device will be assigned.

BRIEF SUMMARY

Embodiments of the invention provide systems and methods that enable wireless devices to be used to as their own vehicle for provisioning and activating the wireless device for use on a wireless carrier network. A wireless device, upon being powered up, may be identified by a wireless carrier network as being unprovisioned. The wireless carrier network may then communicate an initial provisioning request to a provisioning management system. The provisioning management system may then provide the wireless device with access to a download for a mobile application that when downloaded, installed, and executed on the wireless device, allows a user to provision the wireless device for use on the wireless carrier network. Thus, the mobile application is acquired via the wireless carrier network, and is executed prior to provisioning. The mobile application may be used to capture a user's registration information, which may be communicated to the provisioning management system and/or a provider of the wireless carrier network for use in provisioning the wireless device.

In one aspect, a method of provisioning a wireless device for use with a wireless carrier network is provided. The method may include receiving an initial provisioning request. The initial provisioning request may include an identifier associated with the wireless device which is not yet authorized for use on the wireless carrier network beyond provisioning of the wireless device. The method may also include determining, prior to the wireless device being provisioned, that the wireless device is data-ready. Data-ready wireless devices may be configured to download and execute mobile applications. The method may further include providing, prior to the wireless device being provisioned, the wireless device with access to a download for a mobile application. The mobile application may be configured to provision the wireless device over the wireless carrier network when installed and executed by the wireless device. The method may include receiving, prior to the wireless device being provisioned, registration information from the mobile application being executed by the wireless device via the wireless carrier network. The method may also include providing, prior to the wireless device being provisioned, the registration information to a provider of the wireless carrier network for provisioning the wireless device on the wireless carrier network.

In another aspect, a non-transitory computer-readable medium having instructions embedded thereon for provisioning a wireless device for use with a wireless carrier network is provided. The instructions may include computer code for causing a computing device to receive an initial provisioning request. The initial provisioning request may include an identifier associated with the wireless device which is not yet authorized for use on the wireless carrier network beyond provisioning of the wireless device. The instructions may also include computer code for causing a computing device to determine, prior to the wireless device being provisioned, that the wireless device is data-ready. Data-ready wireless devices may be configured to download and execute mobile applications. The instructions may further include computer code for causing a computing device to provide, prior to the wireless device being provisioned, the wireless device with access to a download for a mobile application. The mobile application may be configured to provision the wireless device over the wireless carrier network when installed and executed by the wireless device. The instructions may include computer code for causing a computing device to receive, prior to the wireless device being provisioned, registration information from the mobile application being executed by the wireless device via the wireless carrier network. The instructions may also include computer code for causing a computing device to provide, prior to the wireless device being provisioned, the registration information to a provider of the wireless carrier network for provisioning the wireless device on the wireless carrier network.

In another aspect, a system for provisioning a wireless device for use with a wireless carrier is provided. The system may include a communications interface configured to communicate with a wireless carrier network, a memory, and one or more processors. The one or more processors may be configured to receive, using the communications interface, an initial provisioning request. The initial provisioning request may include an identifier associated with the wireless device which is not yet authorized for use on the wireless carrier network beyond provisioning of the wireless device. The one or more processors may also be configured to determine, prior to the wireless device being provisioned, that the wireless device is data-ready. Data-ready wireless devices may be configured to download and execute mobile applications. The one or more processors may be further configured to provide, using the communications interface, the wireless device with access to a download for a mobile application prior to the wireless device being provisioned. The mobile application may be configured to provision the wireless device over the wireless carrier network when installed and executed by the wireless device. The one or more processors may be configured to receive, using the communications interface, registration information from the mobile application being executed by the wireless device via the wireless carrier network prior to the wireless device being provisioned. The one or more processors may also be configured to provide, using the communications interface, the registration information to a provider of the wireless carrier network for provisioning the wireless device on the wireless carrier network.

DETAILED DESCRIPTION

Figure 1:
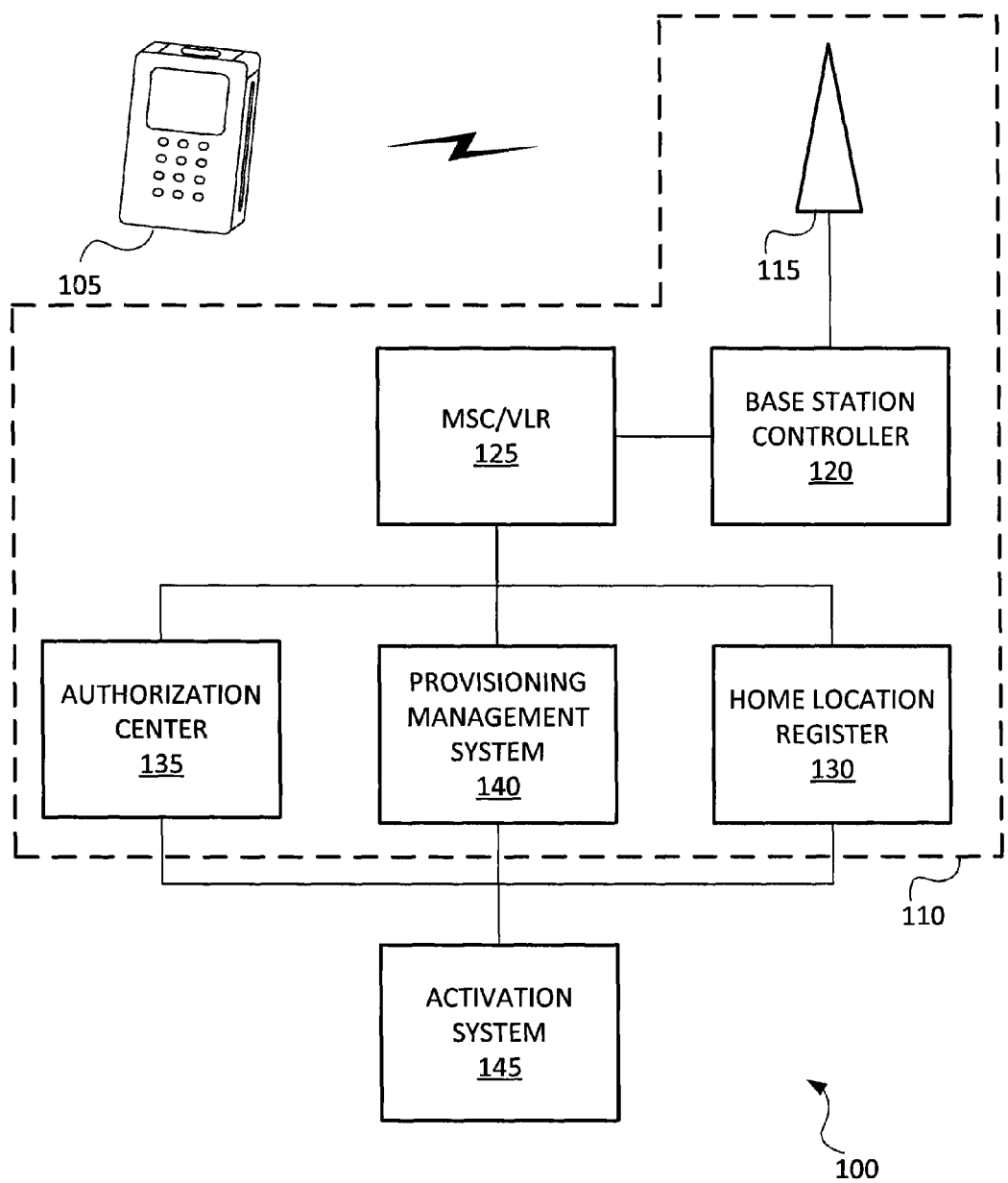
FIG. 1 is a block diagram illustrating an arrangement configured to provision a wireless device.

While aspects of various embodiments have been summarized above, the following detailed description illustrates exemplary embodiments in further detail to enable one of skill in the art to practice these exemplary embodiments. In the following description, for the purposes of explanation, numerous specific details are set forth in order to provide a thorough understanding of features in accordance with various embodiments. It will be apparent, however, to one skilled in the art that other embodiments of the present invention may be practiced without some of these specific details. In other instances, well-known structures and devices are shown in block diagram form. Several embodiments are described below, and while various features are ascribed to different embodiments, it should be appreciated that the features described with respect to one embodiment may be incorporated with other embodiments as well. By the same token, however, no single feature or features of any described embodiment should be considered essential, as other embodiments of the invention may omit such features.

In some embodiments, tools to allow a wireless device to act as the vehicle for its own activation in a wireless network are provided. As used herein, the term "wireless device" is used to mean any type of device that operates by access to a wireless network and requires activation to be operable. Such devices include wireless phones, as well as connected personal digital assistants, portable email devices, some wireless appliances, and/or the like. In one aspect, such devices may operate on what is sometimes referred to as a "wide area cellular" network, including without limitation a Global System for Mobile telecommunications ("GSM") network, a code division multiple access ("CDMA") network, and/or networks operating in accordance with any derivatives thereof (such as General Packet Radio Service ("GPRS"), Enhanced Data rates for GSM Evolution ("EDGE"), CDMA2000, Universal Mobile Telecommunications Standard ("UMTS"), Wideband-CDMA ("W-CDMA") High Speed Packet Access ("HPSA"), and Evolution-Data Optimized ("EVDO") technologies, Long Term Evolution (LTE) among others). Wireless devices may have a SIM installed by a manufacture or service provider and/or may have a SIM supplied separately from the phone. For example, the mobile device may be purchased without a SIM, which may be installed upon purchasing the mobile device and/or a new SIM may be provided and installed in a wireless device upon switching wireless service providers. As described herein, network resources and provisioning are associated with identifiers of the SIM. The mobile device works in conjunction with the SIM to connect to the network for downloading the mobile applications described herein.

In another aspect, some embodiments provide an improved experience for the end user. For example, a simple user interface (UI) may be provided as part of a mobile application that will enable a user to customize service and/or or payment options and complete the provisioning process. Merely by way of example, in accordance with some embodiments, the user can purchase a phone (or other wireless device) at a convenient location (which need not be a dedicated wireless reseller with activation facilities) and yet forgo the traditional need to access a secondary telephone or computer to activate a device purchased under such circumstances. Additionally and/or alternatively, embodiments can, in some cases, allow a user to have a degree of input (which can vary by implementation and/or user preference) into the selection of the MSISDN assigned to the wireless device. In such cases, embodiments can include business processes that can be used to monetize the MSISDN selection process, for example, by charging a fee based on the type of number selection technique chosen by the user.

In a beneficial aspect of some embodiments, these and other features may be provided though the manufacture of SIMs with temporary IMSI numbers in specified ranges. In a particular aspect, these IMSI numbers may not be associated with any subscriber information in the serving operator's network. Rather than routing communications from devices with these temporary IMSI numbers to core network equipment (such as HLRs, authentication centers, and/or the like), the serving operator's network may be configured to route these communications to a provisioning management system that operates in accordance with methods provided by various embodiments. The serving operator's network may also be configured to identify this detection device as a quasi-HLR for the specified range of temporary IMSI numbers. (It should be noted that this "range" of temporary IMSI numbers need not be a contiguous range—any appropriate technique may be used to identify these temporary IMSI numbers and/or distinguish them from "permanent" IMSI numbers that are used for conventional communications with a wireless device.)

In some embodiments, when a serving operator's network receives an initial registration message from a device assigned one of these temporary IMSI numbers, it then may forward this message to a provisioning management system, which provides a profile for the wireless device to the serving operator's network (and/or more particularly, the appropriate equipment, such as a visited location register and/or visited mobile switching center). This profile, provides the wireless device with temporary, yet sufficient, access to the serving operator's network to download a mobile application, which when installed and executed on the wireless device, is usable to perform the provisioning process. The mobile application may be downloaded in one of several ways, such as a download hosted on a website by the provisioning management system and/or wireless carrier network being pushed to the wireless device, or by the user being directed to navigate to an "app store" to download the mobile application. Upon download and installation, the user may open the mobile application and enter registration information, such as a subscription plan or payment information, into a user interface of the mobile application. The mobile application may then provide this registration to the provisioning management system via the wireless carrier network such that the registration information may be used to complete the provisioning process of the wireless device.

Alternatively or additionally, the temporary data connection may also be used for access to a download for a set of mobile applications that the provider of the wireless carrier network makes available. For example, the set of mobile applications may include mobile applications that the provider believes would be especially useful for the user, such as cloud services and/or mobile applications for backing up the content of the wireless device. The set of mobile applications may also include mobile applications provided by partners of the provider that the provider and/or partners wish to support and/or endorse for all users.

The provisioning management system may also be configured to notify an activation system that a wireless device with a temporary IMSI has registered with the network. The activation system, then, may assign a permanent MSISDN to the wireless device (based, perhaps, on an interaction between the user, the mobile application, and the activation system) and/or may assign a permanent IMSI number to the SIM card in the wireless device. The activation system may also create, in the serving operator's core network equipment (e.g., home location registers, authentication centers, etc.) appropriate records including the permanent MSISDN and IMSI number. The temporary MSISDN then may be returned to the pool for re-use by the provisioning management system in another activation procedure.

FIG. 1 illustrates an arrangement 100 between a wireless device 105 and wireless network 110, which may include one or more of a wireless intelligent network ("WIN"), a signaling system 7 ("SS7") network, a public switched telephone network ("PSTN"), a data network (such as an Internet Protocol network, which can include the Internet, an Intranet, and/or the like), a 2G or GSM network, a 3G network, a 4G or LTE network and the like. Wireless devices may include, for example, mobile telephones, tablet computers, wireless-ready appliances, and/or any other computing device configured for communication with a wireless network. The arrangement 100 allows the wireless device 105 to be the vehicle for its own provision/activation. In accordance with a set of embodiments, the network 110 includes (and/or provides communication between) a base station 115, a base station controller 120, a mobile switching center (MSC) 125, a home location register (HLR) 130, and an authentication center 135. The arrangement 100 also includes a provisioning management system 140 and an activation system 145. The provisioning management system 140 can be any device and/or computer system that can be configured to perform the function ascribed herein to the provisioning management system 140. In some cases, the provisioning management system 140 may be implemented by a modified HLR. In other cases, the provisioning management system 140 may be purpose-built from scratch. It will be appreciated that the network 110 might include other components, such as a switching service point, intelligent peripheral, etc., and/or or that the network 110 often will include multiple base stations 115, base station controllers 120, mobile switching centers 135, home location registers 130 and/or authentication centers 135. Likewise, it is possible that two or more of these components might be integrated in a single device.

The activation system 145 can be any computer system and/or device that comprises the necessary configuration and/or software to perform the functions described below to provision and/or activate the handset 105 through a network 110. In one embodiment, the activation system 145 is a single computer; in other embodiments, it may be a group of computers that collectively provide the functionality described herein. In some embodiments, the functionality of the activation system 145 may be handled by the provisioning management system 140.

In the illustrated embodiment, the provisioning management system 140 resides within the network 110, while the activation system 145 is outside the network, although the activation system is in communication (either directly or indirectly) with the provisioning management system 140, as well as the HLR 130, authentication center 135, and/or MSC 125. In various other arrangements, the provisioning management system 140 and/or the activation system 145 may be either inside the network 110 and/or may be in communication, either through the network 110 or otherwise, with various components of the network, as described in FIG. 2. The present arrangement 100 includes the provisioning management system 140 within the wireless network 110, and is representative of systems where a provider of the network 110 operates the provisioning management system 140. Such an arrangement 100 often occurs when the provider purchases and/or licenses a provisioning management system 140 from a third-party; however, in some embodiments the provider may develop and operate their own provisioning management system 140.

Generally, the wireless device 105 has associated therewith an identification number (which may be, but need not necessarily be, an IMSI, and which may be, but need not necessarily be, stored on a SIM installed in the wireless device 105) that identifies the handset to the network, and/or an addressing number (which may be, but need not necessarily be, an MSISDN), which is used by the network 110 to address the wireless device 105 when communicating with the wireless device 105.

In normal operation, when a wireless device 105 registers with the network 110 (e.g., is powered on, enters the service area, etc.), it sends a message, which is received at the base station controller 120 (usually via the base station 115). The message generally will include the identification number of the wireless device 105, either explicitly or implicitly (e.g., the base station controller 120 will be able to ascertain the identification number and associate it with the message, if necessary.) The MSC 125 (or some other component of the network 110) thus identifies the identification number of the wireless device 105 and queries the HLR 130, which returns to the MSC 125 data about the wireless device 105. (While this document, for ease of description, refers to communications between the MSC 125 and other devices, one skilled in the art will appreciate that, in practice, it is often either a visited location register ("VLR"), which, in many cases, is collocated with the MSC 125, the MSC 125 itself and/or some combination thereof, that participates in such communications. Hence, this document sometimes refers to the MSC and VLR collectively, and references herein to operations involving the MSC 125 should be considered to include operations that might involve a VLR as well.) Such data can include the addressing number of the wireless device 105, as well as the capabilities of the wireless device 105.

One mode of operation of the arrangement 100, and in particular the provisioning management system 140 and activation system 145, is described in detail below. In a general sense, however, a set of embodiments provides a provisioning management system 140 that is configured to act as a "quasi-HLR." In other words, the provisioning management system 140 (which is not an HLR 130 and generally does not perform the functions of an HLR 130), is configured to be seen by the network 110—and, in particular the MSC 125—as the HLR for an unactivated wireless device 105. Hence, when the unactivated wireless device 105 attempts to register with the network 110, the MSC 125 queries the provisioning management system 140, rather than the HLR 130, for data about the wireless device 105. To obtain additional information about the wireless device 105, the provisioning management system 140 may establish a temporary data connection for the wireless device 105. The temporary data connection may be limited by a profile that may be created on the physical location register. The profile may include permissions for what destinations, such as websites and/or app stores the wireless device may access using the temporary data connection. In some embodiments, the profile may allow the wireless device 105 to access to a download for a mobile application that may be used to provide registration information that is usable to provision the wireless device 105. The mobile application may be provided by the provisioning management system 140 and/or the network 110.

The mobile application may be downloaded in one of several ways, such as a download hosted on a website by the provisioning management system 140 and/or wireless carrier network 110 being pushed to the wireless device, or by the user being directed to navigate to an "app store" to download the mobile application. Upon download and installation, the user may open the mobile application and enter registration information, such as a subscription plan or payment information, into a user interface of the mobile application. The mobile application may then provide this registration to the provisioning management system 140 via the wireless carrier network 110 such that the registration information may be used to complete the provisioning process of the wireless device.

In some embodiments, the mobile application may transmit registration information inputted by the user to the provisioning management system 140, which may then provide the registration information to the activation system 145 and/or the network 110 for completion of the provisioning process. In some cases, the activation system 145 and/or network 110 may assign a new, permanent identification number to SIM in the wireless device 105 as well. In such cases, the original, temporary identification number can be reused on a different unprovisioned device or SIM in the future. In an aspect, the activation system is also responsible for updating the network 110 to complete activation of the wireless device, as described in further detail below.

Alternatively or additionally, the temporary data connection may also be used for access to a download for a set of mobile applications that the provider of the wireless carrier network 110 makes available. For example, the set of mobile applications may include mobile applications that the provider believes would be especially useful for the user, such as cloud services and/or mobile applications for backing up the content of the wireless device. The set of mobile applications may also include mobile applications provided by partners of the provider that the provider and/or partners wish to support and/or endorse for all users.

Figure 2:
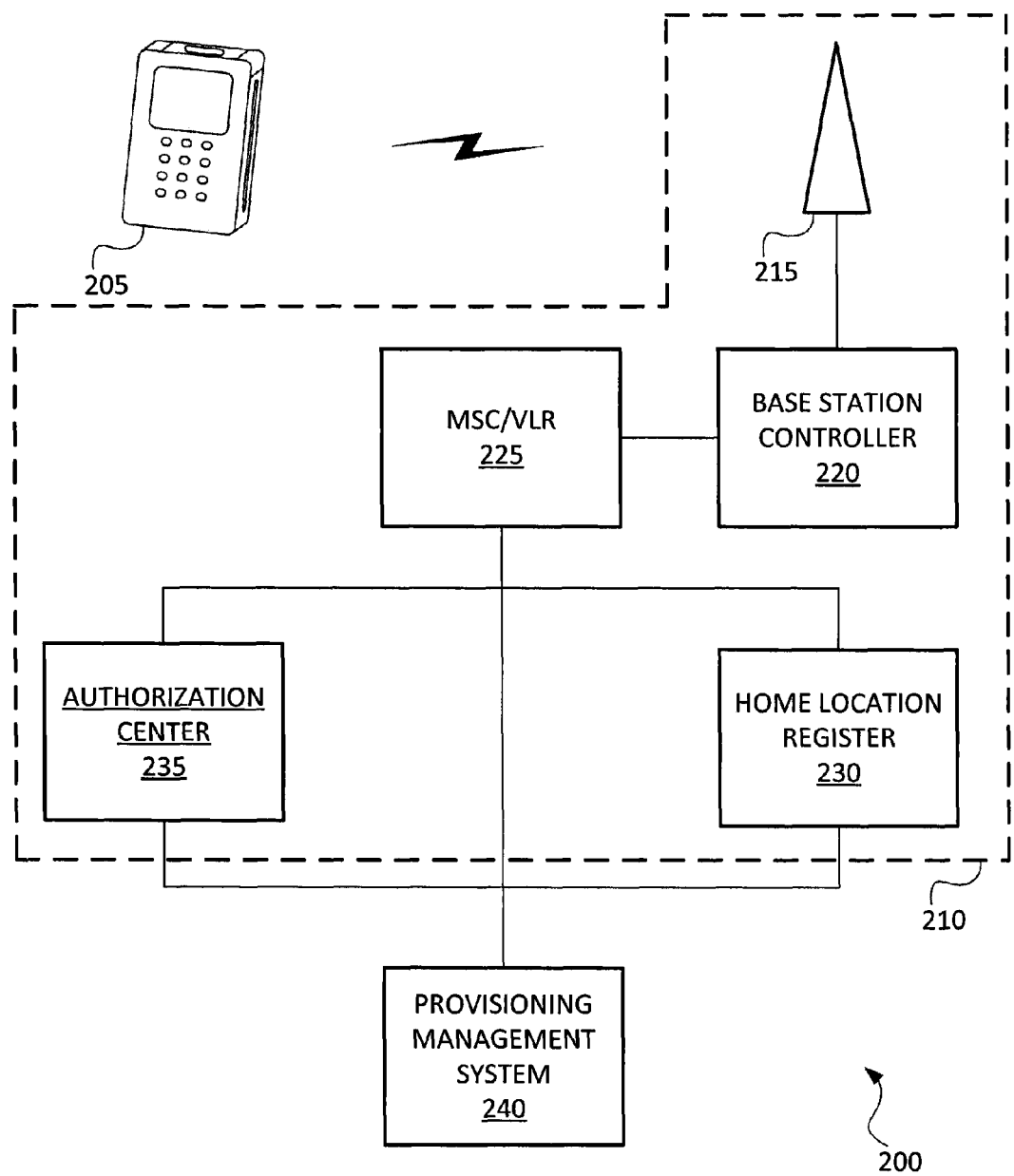
FIG. 2 is a block diagram illustrating an arrangement configured to provision a wireless device.

FIG. 2 illustrates another arrangement 200 between a wireless device 205 and a wireless network 210, in accordance with embodiments of the invention. The arrangement 200 is similar to the arrangement 100 described above; however, a provisioning management system 240 is positioned outside of wireless network 210. The arrangement 200, however, is also configured to allow the wireless device 205 to be the vehicle for its own activation. In accordance with a set of embodiments, in addition to the base station 215, base station controller 220, MSC/VLR 225, HLR 230 and authentication center 235, the arrangement includes a provisioning management system 240. The provisioning management system 240 can be any device and/or computer system that can be configured to perform the function ascribed herein to the provisioning management system 240. In some cases, the provisioning management system 240 may be implemented by a modified HLR; in other cases, the provisioning management system 240 may be purpose-built from scratch. The provisioning management system 240 may perform functions often attributed to the activation system and/or arrangement 200 may include a separate activation system, such as activation system 145 described above.

One mode of operation of the arrangement 200, and in particular the provisioning management system 240, is described in detail below. In a general sense, however, a set of embodiments provides a provisioning management system 240 that is configured to act as a "quasi-HLR." In other words, the provisioning management system 240 (which is not a HLR 230 and generally does not perform the functions of an HLR 230), is configured to be seen by the network 210—and, in particular the MSC 225—as the HLR for an unactivated wireless device 205. Hence, when the unactivated wireless device 205 attempts to register with the network 210, the MSC 225 queries the provisioning management system 240, rather than the HLR 230, for data about the wireless device 205. To obtain additional information about the wireless device 205, the provisioning management system 240 may establish a temporary data connection for the wireless device 205. The temporary data connection may be limited by a profile that may be created on the physical location register. The profile may include permissions for what destinations, such as websites and/or app stores the wireless device may access using the temporary data connection. In some embodiments, the profile may allow the wireless device 205 to access to a download for a mobile application that may be used to provide registration information that is usable to provision the wireless device 205. The mobile application may be provided by the provisioning management system 240 and/or the network 210.

The mobile application may be downloaded in one of several ways, such as a download hosted on a website by the provisioning management system 240 and/or wireless carrier network 210 being pushed to the wireless device, or by the user being directed to navigate to an "app store" to download the mobile application. Upon download and installation, the user may open the mobile application and enter registration information, such as a subscription plan or payment information, into a user interface of the mobile application. The mobile application may then provide this registration to the provisioning management system 240 via the wireless carrier network 210 such that the registration information may be used to complete the provisioning process of the wireless device.

In some embodiments, the mobile application may transmit registration information inputted by the user to the provisioning management system 240, which may then provide the registration information to the activation system 245 and/or the network 210 for completion of the provisioning process. In some cases, the activation system 245 and/or network 210 may assign a new, permanent identification number to SIM in the wireless device 205 as well. In such cases, the original, temporary identification number can be reused on a different unprovisioned device or SIM in the future. In an aspect, the activation system is also responsible for updating the network 210 to complete activation of the wireless device, as described in further detail below.

Alternatively or additionally, the temporary data connection may also be used for access to a download for a set of mobile applications that the provider of the wireless carrier network 210 makes available. For example, the set of mobile applications may include mobile applications that the provider believes would be especially useful for the user, such as cloud services and/or mobile applications for backing up the content of the wireless device. The set of mobile applications may also include mobile applications provided by partners of the provider that the provider and/or partners wish to support and/or endorse for all users.

Figure 3:
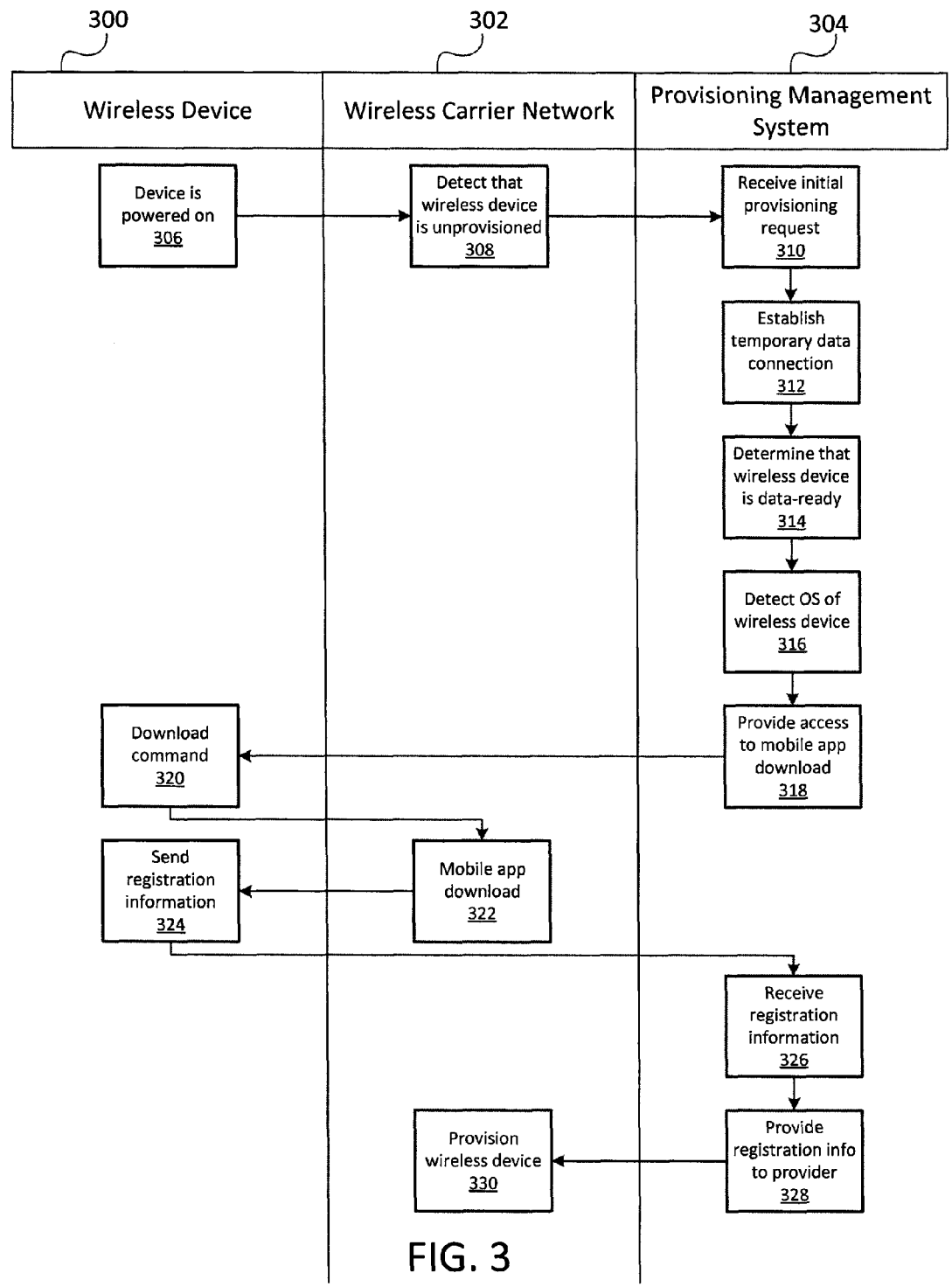
FIG. 3 is a swim lane diagram illustrating communication between a wireless device, a wireless carrier network, and a provisioning management system.

Various methods and processes, such as those described below, may be performed using the systems described in FIGS. 1 and 2. FIG. 3 is a swim lane diagram illustrating a process of provisioning a wireless device according to one embodiment. It will be appreciated that in many embodiments, communications between a wireless device and a provisioning management system as described herein will be communicated using a wireless carrier network and/or components thereof. Such communications may be enabled by the establishment of a temporary data connection.

A wireless device 300 may be powered on at block 306 or otherwise enter a service area of a wireless carrier network 302. The wireless carrier network 302 may detect the presence of the wireless device 300 and determine that the wireless device 300 has not been provisioned for use on the wireless carrier network 302 at block 308. For example, a base station controller or other component of the wireless carrier network 302 may detect a signal from the wireless device 300 within range of a base station, such as a signal requesting to join the wireless carrier network 302. The wireless carrier network 302 may determine that the wireless device 300 is not provisioned. This may be done by the wireless device 300 communicating an identifier, such as an IMSI number to the base station controller to determination whether the wireless device 300 have been provisioned on the wireless carrier network 302. In some embodiments, this determination may be made by a physical location register, such as the HLR and/or VLR as described above. The physical location register may receive the IMSI from the base station controller and compare the IMSI against a list of known IMSI numbers to determine whether the wireless device 300 is unprovisioned. For example, if the IMSI is within a defined range of IMSIs, data gets routed to the provisioning management system 304. Upon determination that the wireless device 300 has not been provisioned, the wireless carrier network 302 may communicate an initial provisioning request to a provisioning management system 304, which may be received at block 310.

A temporary data connection may be established at block 312. For example, a profile may be made by the provisioning management system 304 and provided to the location register. The profile controls what access the wireless device 300 may have to the wireless carrier network 302. The temporary data connection and/or profile may allow the wireless device 300 limited access to data services of the wireless carrier network 302 such that the wireless device 300 may transmit and/or receive data to predetermined destinations, such as the provisioning management system 304 and/or websites and/or other services hosted by the provisioning management system 304. Access to other destinations may be blocked and/or rerouted to an approved or predetermined destination. As one example, if a user attempts to use a browser of the wireless device 300 to access a third party webpage not approved or listed as a predetermined destination, the profile and/or temporary data connection may reroute the user to a webpage of the provisioning management system 304 and/or may provide a webpage message saying that the desired webpage or destination is not available over the current connection.

The provisioning management system 304 may determine that the wireless device 300 is data-ready, such as by comparing the IMSI received from the wireless device 300 to a list or a range of known IMSIs to determine whether the received IMSI belongs to a data-ready device, at block 314. The provisioning management system 304 may then detect an operating system of the wireless device at block 316. This may be done, for example, by looking up the received IMSI in a database that indicates whether the IMSI belongs to a device executing a particular operating system. Such a database may be populated by receiving lists of device and/or SIM IMSI numbers from manufacturers and/or suppliers of the devices. Comparing IMSIs to such databases allows the determination of an operating system both in situations where a wireless device is sold with a SIM preinstalled and where a SIM and wireless device are sold and/or activated separately. For example, if a SIM is purchased separate from a device, the SIM may include software that can determine the operating system of a device within which the SIM is later installed, and pass the information to the provisioning management system 304.

Upon detection of an operating system, the provisioning management system 304 may then provide access to a provisioning mobile application that is configured to provide registration information and/or other information needed to provision the wireless device 300 when installed and executed on the wireless device 300. Mobile applications include software programs that are installable on data-ready devices and are executable by a user interaction with an icon (e.g., a user touching an icon on a touchscreen of the wireless device 300) or a display of the wireless device 300. Mobile applications often enable limited and specific functionality to wireless devices when executed. Several manners of access to the download for the application may be available, and a method of providing access may be selected based on the detected operating system. For example, some operating systems may provide different capabilities than other operating systems. Methods of providing access may include pushing a download hosted by the provisioning management system 304 and/or the wireless carrier network 302 onto the wireless device 300, providing instructions to open a browser of the wireless device 300 to a download location, sending a command causing the wireless device to automatically open a browser to the download location, providing instructions and/or a command to open an "app store" operated by a third-party (e.g., manufacturer of the phone or operating system of the phone) and to download the provisioning mobile application from the app store, and/or other methods.

As one example, the mobile downloads may be provided by sending the wireless device a message with a link to a website and/or instructions to open a browser and navigate to the specified website. Messages may be in the form of SMS, emails, push notifications, and the like. In other embodiments, the provisioning management system may send a command to the wireless device causing a browser to be opened to a universal resource locator (URL) associated with the download website. In other embodiments, the download may be pushed to the wireless device upon receipt of the initial provisioning request and/or the selection of a download manner. In some embodiments, a message may be communicated to the wireless device prompting a user to open a pre-loaded "app store" mobile application and to search for the desired mobile application. In other embodiments, the provisioning management system may send a command to the wireless device causing an "app store" mobile application of the wireless device to open to the desired mobile application for download.

A download command may be received by the wireless device 300 at block 320. The download command may be received as a result of user input, such as when a user opens a browser or app store and selects the provisioning mobile application for download. The download command may also originate from the provisioning management system 304, such as when the provisioning management system 304 pushes a download to the wireless device 300. The provisioning mobile application may be downloaded at block 322. The download may be hosted by a server of the wireless carrier network 302, the provisioning management system 304, and/or a third party that hosts the download, such as the host of an app store. The provisioning mobile application may be downloaded and installed on the wireless device 300. The wireless device 300 may then execute the provisioning mobile application or may execute in response to user selection of the installed application, which may prompt a user of the wireless device 300 to provide registration information that may be used to provision the wireless device 300. Registration information may include carrier subscription plan information detailing what voice, text, and/or data services for which the user wishes to enroll the wireless device. The registration information may also include information about the user (name, address, date of birth, etc.), payment details, a default phone number or MSISDN, a selection of a subscription plan, a selection from a list of available MSISDN numbers to use with the wireless device, and/or other information that the provisioning management system and/or a provider of the wireless carrier network may need to complete provisioning of the wireless device. The registration information may be sent to the provisioning management system 304 at block 324. Upon receiving the registration information at block 326, the provisioning management system 304 may provide the registration information to the wireless carrier network 302 at block 328. The wireless carrier network 302 may then provision the wireless device 300 for use on the wireless carrier network 302. Thus, for blocks 306-328, the wireless device 300 is not yet provisioned.

Figure 4:
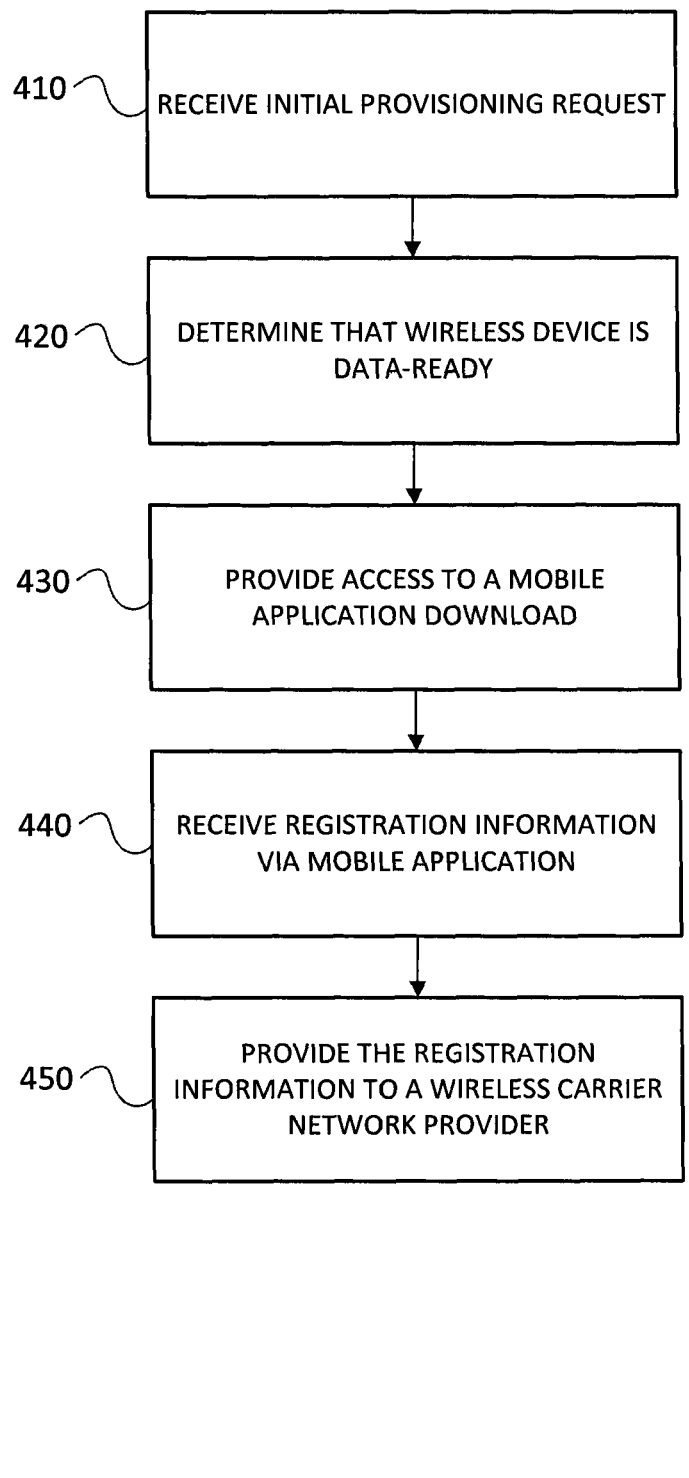
FIG. 4 is a process flow diagram illustrating a method of provisioning a wireless device for use with a wireless carrier network.

FIG. 4 illustrates an embodiment of a method 400 for provisioning a wireless device. Each step of method 400 may be performed using a computer system, such as a provisioning management system as described above. The provisioning management system may communicate with wireless devices via the network. In some embodiments, each step may be performed by a single computerized device. In some embodiments, a cloud-based programming arrangement may be used to create an application using a programming language to perform method 400. Likewise, the cloud-based execution environment may be used to perform method 400 such that the steps of method 400 are performed by a computer server remotely from a client device used by a user to interact with the computer server. For instance, the application may be executed via a web browser. Each step of method 400 is performed prior to provisioning by the wireless carrier network.

A wireless carrier network, such as network 110 or 210 described above, may detect that a wireless device has been powered on within the network. In some embodiments, a base station and/or base station controller may detect the presence of the wireless device within range of the base station. The wireless device may communicate information, such as identifier or IMSI to the base station controller and/or other components within the network such as a VLR as described above. If the base station controller and/or other component determine that the identifier belongs to a wireless device and/or SIM that has not been provisioned on the network. This may be done, for example, by comparing the received identifier to a list of identifiers of devices and/or SIMs that have been provisioned for use on the network.

At block 410, an initial provisioning request is received. The request may be from the wireless device and/or the network. For example, the wireless network, after determining that the wireless device is not provisioned for use on the wireless network, may communicate the initial provisioning request to a provisioning management system.

At block 420, a determination that the wireless device is data-ready is made. Data-ready devices are configured to download and execute mobile applications, as well as download and/or upload other data using a 2G, 3G, GSM, LTE, other cellular communications network, and/or other wireless carrier network. Data-ready devices include smartphones, tablet computers, and/or other computing devices capable of communicating data over such networks. This determination may be made by comparing the IMSI received from the wireless device 300 to a list or a range of known IMSIs to determine whether the received IMSI belongs to a data-ready device.

At block 430, the wireless device is provided with access to a download for a mobile application usable to provision the wireless device when downloaded, installed, and executed on the wireless device. The download access may be provided in one or more ways. For example, the mobile downloads may be provided by sending the wireless device a message with a link to a website and/or instructions to open a browser and navigate to the specified website.

Messages may be in the form of SMS, emails, push notifications, and the like. In other embodiments, the provisioning management system may send a command to the wireless device causing a browser to be opened to a (URL) associated with the download website. In other embodiments, the download may be automatically pushed to the wireless device upon receipt of the initial provisioning request and/or the selection of a download manner. In some embodiments, a message may be communicated to the wireless device prompting a user to open a pre-loaded "app store" mobile application and to search for the desired mobile application. In other embodiments, the provisioning management system may send a command to the wireless device causing an "app store" mobile application of the wireless device to open to the desired mobile application for download.

At block 440, registration information is received from the mobile application being executed by the wireless device via the wireless network. The registration information may include, for example, carrier subscription plan information detailing what voice, text, and/or data services for which the user wishes to enroll the wireless device. The registration information may also include payment details, a default phone number or MSISDN, a selection from a list of available MSISDN numbers to use with the wireless device, and/or other information that the provisioning management system and/or a provider of the wireless carrier network may need to complete provisioning of the wireless device. The registration information may be provided to a provider of the wireless carrier network at block 450 where the information may be used to complete provisioning of the wireless device. As one example, the registration information may be communicated to the provisioning management system, which may transmit the registration information into the network provider.

Figure 5:
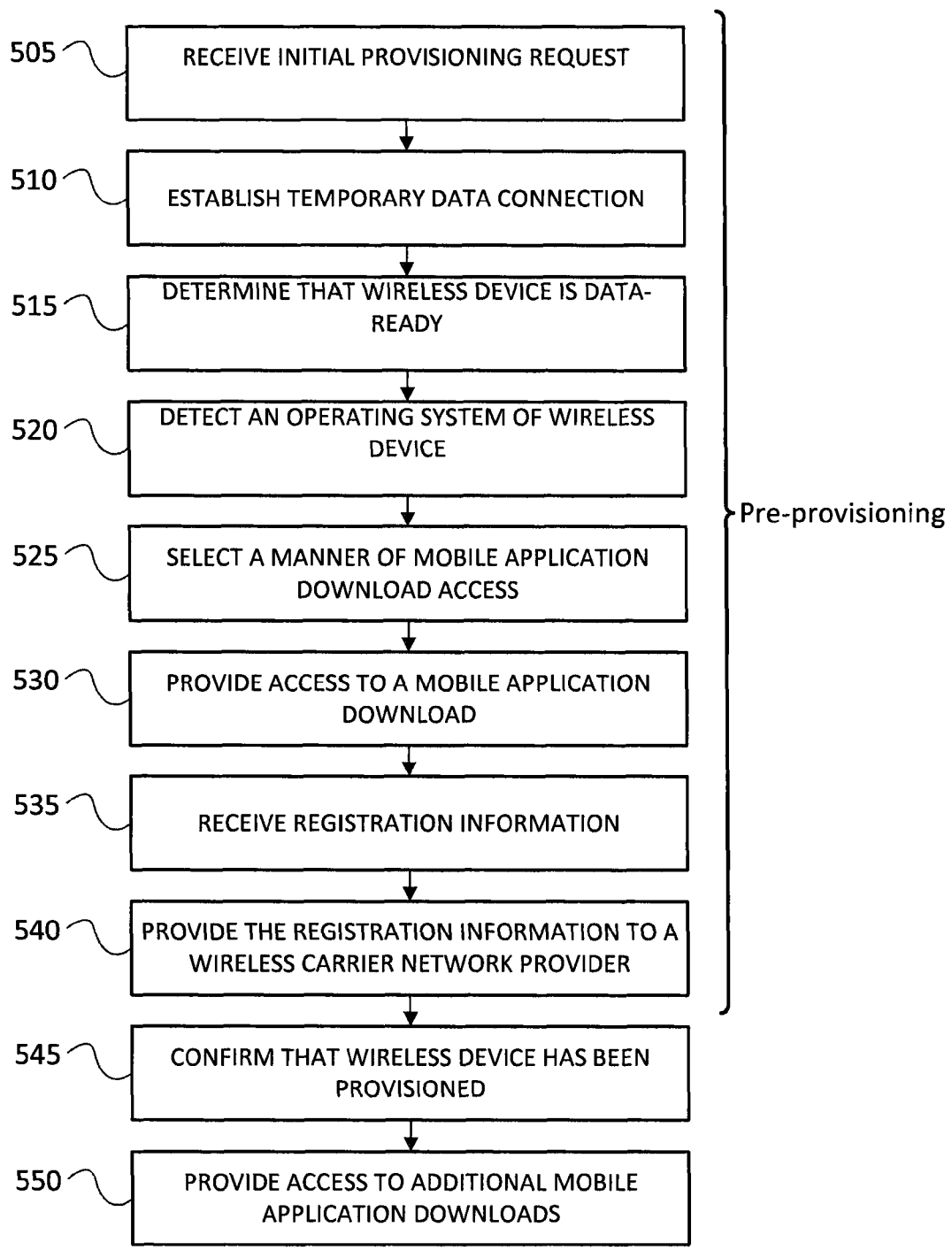
FIG. 5 is a process flow diagram illustrating a method of provisioning a wireless device for use with a wireless carrier network.

FIG. 5 illustrates another embodiment of a method 500 for provisioning a wireless device. Each step of method 500 may be performed using a computer system, such as a provisioning management system as described above. The provisioning management system may communicate with wireless devices via the network. In some embodiments, each step may be performed by a single computerized device. In some embodiments, a cloud-based programming arrangement may be used to create an application using a programming language to perform method 500. Likewise, the cloud-based execution environment may be used to perform method 500 such that the steps of method 500 are performed by a computer server remotely from a client device used by a user to interact with the computer server. For instance, the application may be executed via a web browser.

A wireless carrier network, such as network 110 or 210 described above, may detect that a wireless device has been powered on within the network. In some embodiments, a base station and/or base station controller may detect the presence of the wireless device within range of the base station. The wireless device may communicate information, such as identifier or IMSI to the base station controller and/or other components within the network such as a VLR as described above. If the base station controller and/or other component determine that the identifier belongs to a wireless device and/or SIM that has not been provisioned on the network. This may be done, for example, by comparing the received identifier to a list of identifiers of devices and/or SIMs that have been provisioned for use on the network.

At block 505, an initial provisioning request is received. The request may be from the wireless device and/or the network. For example, the wireless network, after determining that the wireless device is not provisioned for use on the wireless network, may communicate the initial provisioning request to a provisioning management system.

At 510, a temporary data connection may be established providing the wireless device with limited access to the wireless network. This allows the wireless device to transmit and/or receive data related to the provisioning process. For example, data may be sent using SMS and/or over a data connection, such as 2G, 3G, LTE, GSM, and the like. However, the temporary data connection may only permit communications to designated destinations, such as the provisioning management system, while preventing communications to and/or from other parties, such as contacts of the user and/or third party websites.

At block 515, a determination that the wireless device is data-ready is made. This determination may be made by comparing the IMSI received from the wireless device 300 to a list or a range of known IMSIs to determine whether the received IMSI belongs to a data-ready device.

At block 520, an operating system of the wireless device may be detected. This may be done, for example, by comparing the IMSI or other identifier to a list of identifiers. The list may have a number of identifiers, with ranges or subsets of identifiers assigned to wireless devices and/or SIM cards that operate using a particular operating system. For example, software encoded on the SIM may determine the IMSI and send the IMSI to the provisioning management system. Additionally, the provisioning system may communicate a message to the wireless device requesting an indication of the operating system over the temporary data connection. The wireless device may respond with a message indicating the operating system present on the wireless device.

At block 525, a manner of access to a download for a mobile application usable to provision the wireless device for use on the wireless network may be selected based on the detected operating system. Each operating system may have its own set of properties and range of functionality. Thus, different operating systems may be able to utilize one or more different download methods than other operating systems. For example, a first operating system may permit only downloading from a mobile application database or "app store" operated by a third-party, while a second operating system may permit app store downloads in addition to downloads hosted by the provisioning management system and/or wireless network. In some embodiments, the operating system may not be detectable and/or the ability to use one or more download access methods may be unknown. In such embodiments, a default download access method, such as sending a message with instructions to navigate to a provisioning mobile application on an app store, may be utilized.

At block 530, the provisioning management system provides the wireless device with access to the download for the mobile application using the selected manner of download. The download access may be provided in one or more ways. For example, the mobile downloads may be provided by sending the wireless device a message with a link to a website and/or instructions for the user to open a browser and navigate to the specified website. Messages may be in the form of SMS, emails, push notifications, and the like. In other embodiments, the provisioning management system may send a command to the wireless device causing a browser to be opened to a universal resource locator (URL) associated with the download website. In other embodiments, the download may be automatically pushed to the wireless device upon receipt of the initial provisioning request and/or the selection of a download manner. In some embodiments, a message may be communicated to the wireless device prompting a user to open a pre-loaded "app store" mobile application and to search for the desired mobile application. In other embodiments, the provisioning management system may send a command to the wireless device causing an "app store" mobile application of the wireless device to open to the desired mobile application for download.

The user of the wireless device may download and install the mobile application on the wireless device. Upon installation, the user may open the provisioning mobile application to complete the provisioning process. In some embodiments, upon installation, the provisioning mobile application may auto-run, or execute without user interaction with the wireless device. In other embodiments, the user may be prompted with a message or otherwise instructed to open the provisioning mobile application to complete the provisioning process. Mobile applications, such as those downloaded from an app store, may have icons that a user may touch or otherwise interact with to open the mobile application. In embodiments where a mobile application was downloaded from a website link and/or a download was pushed onto the wireless device, a binary file may be downloaded into a destination folder of the wireless device, such as a download folder. The user may be instructed, by the website and/or a message sent with download and installation instructions, to open the destination folder and open the downloaded installation file to execute the mobile application.

At block 535, registration information may be received by the provisioning device. Registration information may include carrier subscription plan information detailing what voice, text, and/or data services for which the user wishes to enroll the wireless device. The registration information may also include payment details, a default phone number or MSISDN, a selection from a list of available MSISDN numbers to use with the wireless device, and/or other information that the provisioning management system and/or a provider of the wireless carrier network may need to complete provisioning of the wireless device. The mobile application, when executed, provides a simple user interface configured to be executed on a particular operating system and/or wireless device. This allows users an interface from which the user may customize plan details, payment information, phone number, and/or other details. In some embodiments, the options for the various types of registration information may be encoded in the software of the provisioning mobile application. In other embodiments, the provisioning mobile application may request the options and/or other details from the provisioning management system and/or provider of the wireless carrier network. The provisioning management system may provide appropriate options based on the operating system, wireless device, and/or the provider of the wireless carrier network. Upon entry of the details by the user, the provisioning mobile application may transmit the details to the provisioning management system.

At block 540, the registration information may be communicated to the provider of the wireless network such that the wireless device may be provisioned for use on the network. This may include activating the wireless device for voice, text, and/or data service using the wireless carrier network according to a selected subscription and/or other provider service plan. In many embodiments, each of the steps 505-540 is completed prior to the provisioning of the wireless device.

In some embodiments, the provisioning mobile application may be deleted by the user upon successful provisioning and/or activation of the wireless device. In other embodiments, the provisioning mobile application may be retained and may serve as the carrier or provider's presence on the wireless device. The provisioning mobile application may then be usable to access and make changes to service details, bill and payment information, and/or otherwise interact with the carrier.

At block 545, the provisioning system may confirm that the device has been provisioned successfully. This may include, for example, receiving an indication that the provisioning was successful from the wireless device and/or the wireless carrier network.

At block 550, access to additional mobile application downloads may be provided. Additional mobile applications may include a set of mobile applications that the carrier or provider believes may be useful and/or desirable for the user of the wireless device. The additional mobile applications may also be supplied by partners of the carrier and/or provider, which may be compensated for including a particular mobile application within the set of applications. Such applications may include cloud networking applications, content backup applications, and/or other mobile applications. Other applications may be sponsored by third-parties that may have partnered with the carrier to provide access to a download of their mobile applications.

Access to the additional mobile application downloads may be provided at any point in method 500. In some embodiments, the set of additional mobile applications may be provided prior to and/or along with the provisioning mobile application. For example, the download location (i.e., app store or webpage) of the provisioning mobile application may include download files for the set of additional mobile applications such that the user may download some or all of the additional mobile applications along with the provisioning mobile application. In some embodiments, the download file for the provisioning mobile application will include download data for the set of additional mobile applications such that when installed on the wireless device, the set of additional mobile applications are installed in addition to the provisioning mobile application.

In some embodiments, access to the set of additional mobile applications may be provided at a later point in the method 500. For example, access to downloads for the set may be provided upon providing registration information to the provisioning management system, either before or after the wireless device has been provisioned. Access to the set of additional mobile applications may be provided using similar methods as the provisioning mobile application as described above.

In some embodiments, the users may select some, all, or none of the set of additional mobile applications to download and/or install. In other embodiments, such as those where download and/or install data for the set of additional mobile applications is included in the download file for the provisioning mobile application, the user may be forced to download some or all of the set of additional mobile applications.

Figure 6:
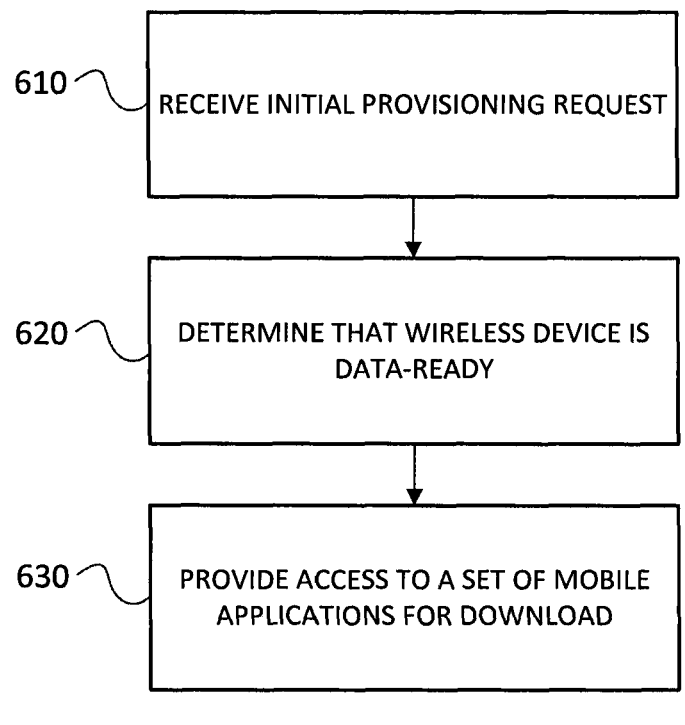
FIG. 6 is a process flow diagram illustrating a method of providing a subset of mobile applications to a wireless device.
Figure 6:

FIG. 6 illustrates an embodiment of a method 600 for providing access to download a set of mobile applications to a wireless device. The set of mobile applications may be applications that the carrier or provider wants the user to have and/or would be useful to the user. Such applications may include cloud networking applications, content backup applications, and/or other mobile applications. Other applications may be sponsored by third-parties that may have partnered with the carrier to provide access to a download of their mobile applications. Each provider or carrier may determine which mobile applications to include in the set of mobile applications and provide the download data to the provisioning management system. Providing a set of mobile applications as described herein may be particularly useful in situations where a SIM is purchased separately from a wireless device. In such cases, the producer of the SIM may not know what provider, carrier, and/or operating system will be used with a wireless device in which the SIM is to be installed. Using the following methods, a provider or carrier of a wireless communication network may provide a set of mobile applications for use on the wireless device and/or SIM upon commencement and/or completion of a provisioning and/or activation process.

Each step of method 600 may be performed using a computer system, such as a provisioning management system as described above. The provisioning management system may communicate with wireless devices via the network. In some embodiments, each step may be performed by a single computerized device or by multiple computerized devices. In some embodiments, a cloud-based programming arrangement may be used to create an application using a programming language to perform method 600. Likewise, the cloud-based execution environment may be used to perform method 600 such that the steps of method 600 are performed by a computer server remotely from a client device used by a user to interact with the computer server. For instance, the application may be executed via a web browser.

A wireless carrier network, such as network 110 or 210 described above, may detect that a wireless device has been powered on within the network. In some embodiments, a base station and/or base station controller may detect the presence of the wireless device within range of the base station. The wireless device may communicate information, such as identifier or IMSI to the base station controller and/or other components within the network such as a VLR as described above. If the base station controller and/or other component determine that the identifier belongs to a wireless device and/or SIM that has not been provisioned on the network. This may be done, for example, by comparing the received identifier to a list of identifiers of devices and/or SIMs that have been provisioned for use on the network.

At block 610, an initial provisioning request is received. The request may be from the wireless device and/or the network. For example, the wireless network, after determining that the wireless device is not provisioned for use on the wireless network, may communicate the initial provisioning request to a provisioning management system.

At block 620, a determination that the wireless device is data-ready is made. This determination may be made similar to the determination made in methods 400 and 500. At block 630, the provisioning management system provides the wireless device with access to a download for the set of mobile applications. The download access may be provided in one or more ways. For example, the mobile downloads may be provided by sending the wireless device a message with a link to a website and/or instructions for the user to open a browser and navigate to the specified website. Messages may be in the form of SMS, emails, push notifications, and the like. In other embodiments, the provisioning management system may send a command to the wireless device causing a browser to be opened to a universal resource locator (URL) associated with the download website. In other embodiments, the download may be automatically pushed to the wireless device upon receipt of the initial provisioning request and/or the selection of a download manner by either provisioning management system via the wireless carrier network or by the wireless carrier network. In some embodiments, a message may be communicated to the wireless device prompting a user to open a pre-loaded "app store" mobile application and to search for the desired mobile application. In other embodiments, the provisioning management system may send a command to the wireless device causing an "app store" mobile application of the wireless device to open to the desired mobile application for download.

Figure 7:
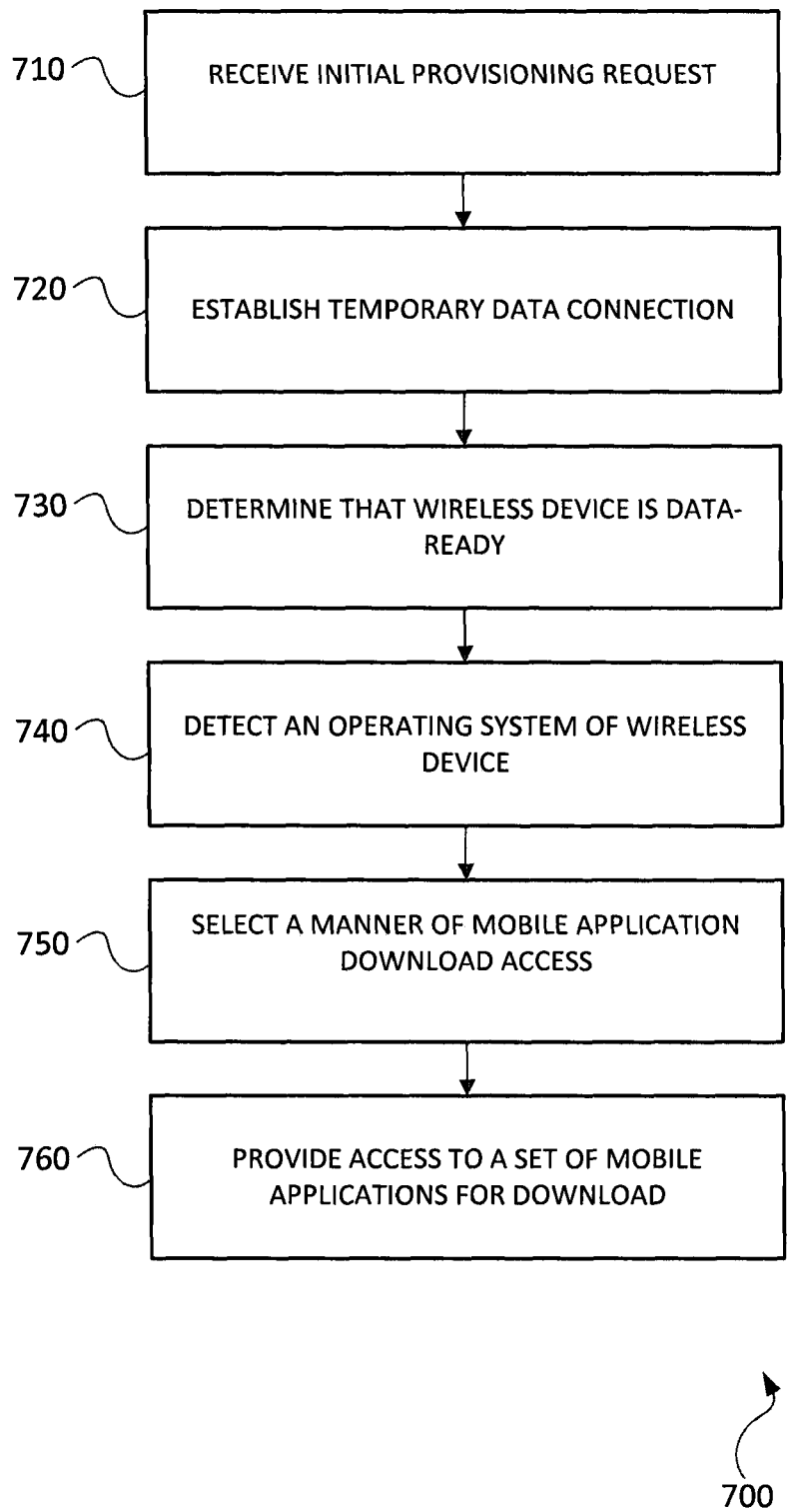
FIG. 7 is a process flow diagram illustrating a method of providing a subset of mobile applications to a wireless device.

FIG. 7 illustrates another embodiment of a method 700 for providing access to download a set of mobile applications to a wireless device. Each step of method 700 may be performed using a computer system, such as a provisioning management system as described above. The provisioning management system may communicate with wireless devices via the network. In some embodiments, each step may be performed by a single computerized device. In some embodiments, a cloud-based programming arrangement may be used to create an application using a programming language to perform method 700. Likewise, the cloud-based execution environment may be used to perform method 700 such that the steps of method 700 are performed by a computer server remotely from a client device used by a user to interact with the computer server. For instance, the application may be executed via a web browser.

A wireless carrier network, such as network 110 or 210 described above, may detect that a wireless device has been powered on within the network. In some embodiments, a base station and/or base station controller may detect the presence of the wireless device within range of the base station. The wireless device may communicate information, such as identifier or IMSI to the base station controller and/or other components within the network such as a VLR as described above. If the base station controller and/or other component determine that the identifier belongs to a wireless device and/or SIM that has not been provisioned on the network. This may be done, for example, by comparing the received identifier to a list of identifiers of devices and/or SIMs that have been provisioned for use on the network.

At block 710, an initial provisioning request is received. The request may be from the wireless device and/or the network. For example, the wireless network, after determining that the wireless device is not provisioned for use on the wireless network, may communicate the initial provisioning request to a provisioning management system.

At block 720, a temporary data connection may be established providing the wireless device with limited access to the wireless network. This allows the wireless device to transmit and/or receive data, such as to provide access to downloads for the set of mobile applications as described above. At block 730, a determination that the wireless device is data-ready is made. This determination may be made similar to the determination made in methods 400, 500, and 600.

At block 740, an operating system of the wireless device may be detected. This may be done, for example, by comparing IMSI or other the identifier to a list of identifiers. The list may have a number of identifiers, with ranges or subsets of identifiers assigned to wireless devices and/or SIM cards that operate using a particular operating system. Additionally, the provisioning system may communicate a message to the wireless device requesting an indication of the operating system over the temporary data connection. The wireless device may respond with a message indicating the operating system present on the wireless device.

At block 750, a manner of access to downloads for the set of mobile applications may be selected based on the detected operating system. Each operating system may have its own set of properties and range of functionality. Thus, different operating systems may be able to utilize one or more different download methods than other operating systems.

At block 760, the provisioning management system provides the wireless device with access to one or more downloads for the set of mobile applications using the selected manner of download. The download access may be provided in one or more ways. For example, the mobile downloads may be provided by sending the wireless device a message with a link to a website and/or instructions to open a browser and navigate to the specified website. Messages may be in the form of SMS, emails, push notifications, and the like. In other embodiments, the provisioning management system may send a command to the wireless device causing a browser to be opened to a (URL) associated with the download website. In other embodiments, the download may be automatically pushed to the wireless device upon receipt of the initial provisioning request and/or the selection of a download manner. In some embodiments, a message may be communicated to the wireless device prompting a user to open a pre-loaded "app store" mobile application and to search for the desired mobile application. In other embodiments, the provisioning management system may send a command to the wireless device causing an "app store" mobile application of the wireless device to open to the desired mobile application for download. The user of the wireless device may download and install the set of mobile applications on the wireless device.

In some embodiments, the users may select some, all, or none of the set of additional mobile applications to download and/or install. In other embodiments, such as those where download and/or install data for the set of additional mobile applications is included in the download file for the provisioning mobile application, the user may be forced to download some or all of the set of additional mobile applications. Sometime after step 760, provisioning for the wireless carrier network associated with one or more applications is performed.

Figure 8:
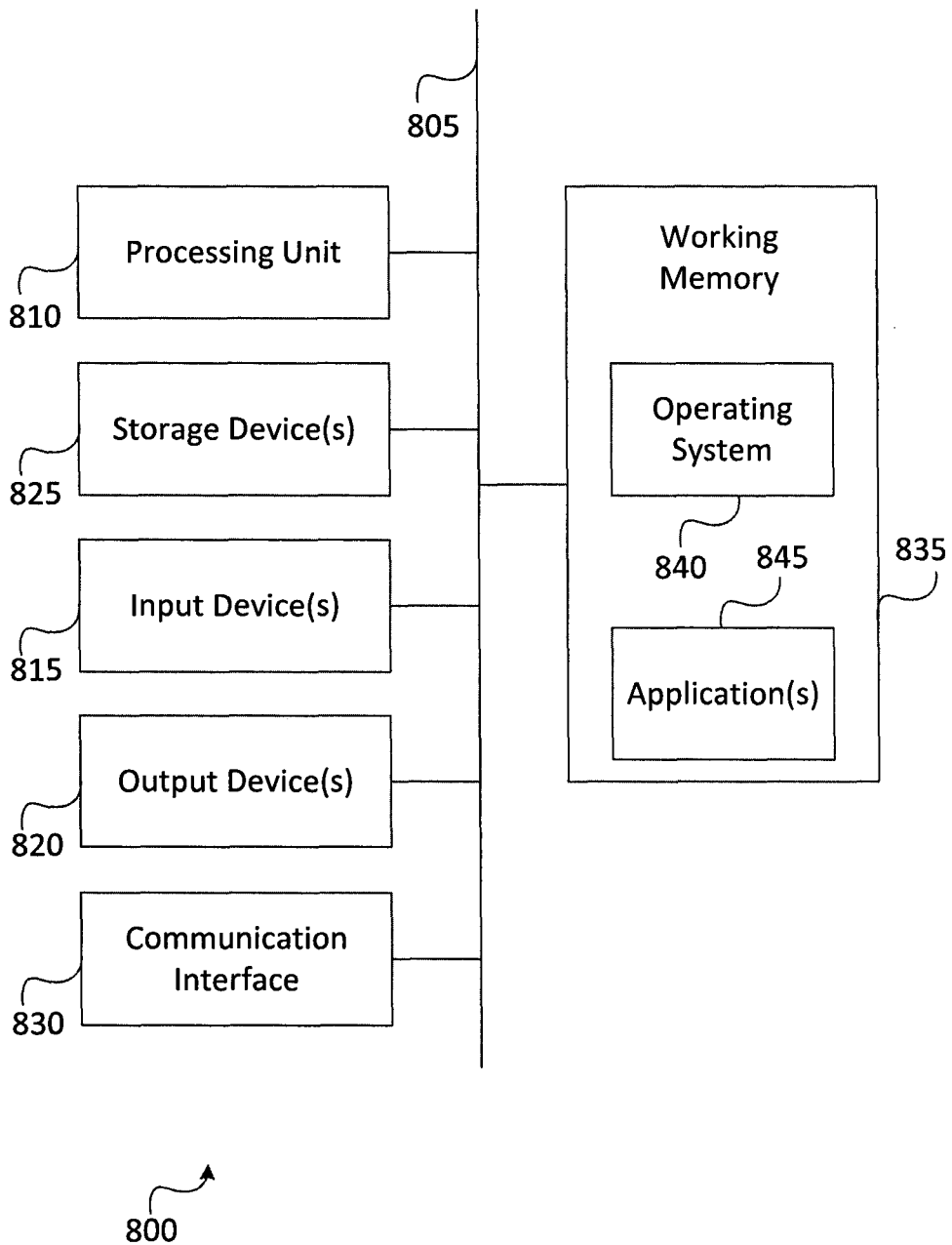
FIG. 8 is a generalized schematic diagram illustrating a computer system, in accordance with various embodiments of the invention.

FIG. 8 provides a schematic illustration of one embodiment of a computer system 800 that can perform the methods of the invention, as described herein, and/or can function as a detection device, an activation system, and/or one or more components of a wireless network. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including without limitation one or more general-purpose processors and/or one or more special-purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 and/or other code, such as one or more application programs 845, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various machine-readable media might be involved in providing instructions/code to processor(s) 810 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 825. Volatile media includes, without limitation dynamic memory, such as the working memory 835. Transmission media includes coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
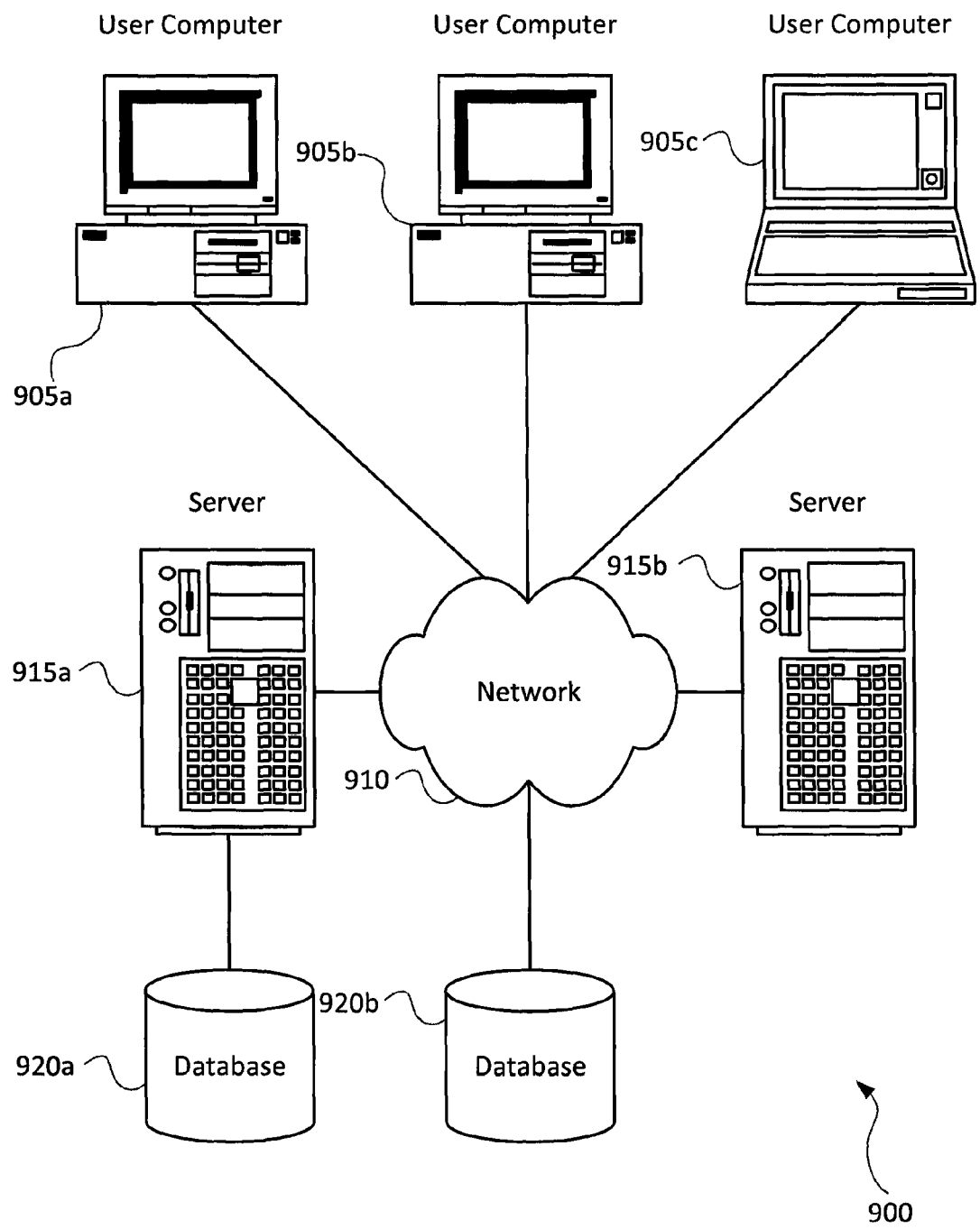
FIG. 9 is a block diagram illustrating a networked system of computers, which can be used in accordance with various embodiments of the invention.

As indicated above, a set of embodiments comprises systems for activating wireless devices and/or implementing business processes based on the activation of such devices. Merely by way of example, FIG. 9 illustrates a schematic diagram of a system 900 that can be used in accordance with one set of embodiments. The system 900 can include one or more user computers 905. The user computers 905 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 905 can also have any of a variety of applications, including one or more applications configured to perform methods of the invention, as well as one or more office applications, database client and/or server applications, and web browser applications. Alternatively, the user computers 905 can be any other electronic device, such as a thin-client computer, Internet-enabled mobile telephone, and/or personal digital assistant, capable of communicating via a network (e.g., the network 910 described below) and/or displaying and navigating web pages or other types of electronic documents. Although the exemplary system 900 is shown with three user computers 905, any number of user computers can be supported.

Certain embodiments of the invention operate in a networked environment, which can include a network 910. The network 910 can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), including without limitation an Ethernet network, a Token-Ring network and/or the like; a wide-area network; a virtual network, including without limitation a virtual private network ("VPN"); the Internet; an intranet; an extranet; a wireless network (as described above), a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915. In an aspect, an activation system may comprise one or more server computers 915, each of which might implement various portions of the functionality described above.

The server computers 915, in some embodiments, might include one or more application servers, which can include one or more applications (such as an activation application comprising instructions to perform operations in accordance with the handset activation methods described above, business applications, including supply chain management applications, etc.) accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 905 and/or another server 915. In some embodiments, an application server can create web pages dynamically for displaying the information in accordance with embodiments of the invention, such as web pages for allowing an operator of an entity in a supply chain to view data related to the activation process, web pages transmitted to a handset during the activation process, and/or the like. Data provided by an application server may be formatted as web pages (comprising HTML, Javascript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement methods of the invention incorporated by an application running on a user computer 905 and/or another server 915. Alternatively, as those skilled in the art will appreciate, a file server can include all necessary files, allowing such an application to be invoked remotely by a user computer 905 and/or server 915. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920*a* might reside on a storage medium local to (and/or resident in) a server 915*a* (and/or a user computer 905). Alternatively, a database 920*b* can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 935 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of provisioning a wireless device for use with a wireless carrier network, the method comprising:
  receiving an initial provisioning request, the initial provisioning request comprising an identifier associated with the wireless device, wherein the wireless device is not yet authorized for use on the wireless carrier network beyond provisioning of the wireless device;
  determining, prior to the wireless device being provisioned, that the wireless device is data-ready, wherein data-ready wireless devices are configured to download and execute mobile applications;
  providing, prior to the wireless device being provisioned, the wireless device with access to a download for a mobile application, wherein the mobile application is configured to provision the wireless device over the wireless carrier network when installed and executed by the wireless device;
  receiving, via the wireless carrier network, prior to the wireless device being provisioned, registration information from the mobile application being executed by the wireless device; and
  providing, prior to the wireless device being provisioned, the registration information to a provider of the wireless carrier network, the registration information being used for provisioning the wireless device on the wireless carrier network.

2. The method of provisioning a wireless device for use with a wireless network of claim 1, wherein:
  provisioning the wireless device comprises activating voice and data functionality of the wireless device on the wireless carrier network.

3. The method of provisioning a wireless device for use with a wireless carrier network of claim 1, wherein:
  providing the wireless device with access to a download comprises pushing a download of the mobile application to the wireless device.

4. The method of provisioning a wireless device for use with a wireless carrier network of claim 1, wherein:

providing the wireless device with access to a download comprises directing a browser of the wireless device to a website having a link to a download source for the mobile application.

5. The method of provisioning a wireless device for use with a wireless carrier network of claim 1, wherein:
providing the wireless device with access to a download comprises directing the wireless device to a download location for the mobile application on a mobile application database operated by a third party.

6. The method of provisioning a wireless device for use with a wireless carrier network of claim 5, wherein:
directing the wireless device to the download location comprises communicating a message to the wireless device, via the wireless carrier network, the message including instructions to open a browser of the wireless device to the download location.

7. The method of provisioning a wireless device for use with a wireless carrier network of claim 1, further comprising:
detecting, prior to the wireless device being provisioned, an operating system of the wireless device, wherein a manner of providing the wireless device with access to a download for a mobile carrier application is selected based on the detected operating system.

8. A non-transitory computer-readable medium having instructions embedded thereon for provisioning a wireless device for use with a wireless carrier network, the instructions comprising computer code for causing a computing device to:
receive an initial provisioning request, the initial provisioning request comprising an identifier associated with the wireless device, wherein the wireless device is not yet authorized for use on the wireless carrier network beyond provisioning of the wireless device;
determine, prior to the wireless device being provisioned, that the wireless device is data-ready, wherein data-ready wireless devices are configured to download and execute mobile applications;
provide, prior to the wireless device being provisioned, the wireless device with access to a download for a mobile application, wherein the mobile application is configured to provision the wireless device over the wireless carrier network when installed and executed by the wireless device;
receive, via the wireless carrier network, prior to the wireless device being provisioned, registration information from the mobile application being executed by the wireless device; and
provide, prior to the wireless device being provisioned, the registration information to a provider of the wireless carrier network, the registration information being used for provisioning the wireless device on the wireless carrier network.

9. The non-transitory computer-readable medium having instructions embedded thereon for provisioning a wireless device for use with a wireless carrier network of claim 8, wherein:
registration information comprises one or more of a service plan for the wireless device, payment information, or a mobile telephone number of the wireless device.

10. The non-transitory computer-readable medium having instructions embedded thereon for provisioning a wireless device for use with a wireless carrier network of claim 9, the instructions further comprising computer code for causing a computing device to:
establish, prior to the wireless device being provisioned, a temporary data connection using the wireless carrier network such that the mobile application is downloadable and usable to complete provisioning by the wireless device.

11. The non-transitory computer-readable medium having instructions embedded thereon for provisioning a wireless device for use with a wireless carrier network of claim 8, the instructions further comprising computer code for causing a computing device to:
confirm that the wireless carrier network recognizes the wireless device as being provisioned.

12. The non-transitory computer-readable medium having instructions embedded thereon for provisioning a wireless device for use with a wireless carrier network of claim 8, wherein:
providing the wireless device with access to a download comprises directing a browser of the wireless device to a website having a link to a download source for the mobile application.

13. The non-transitory computer-readable medium having instructions embedded thereon for provisioning a wireless device for use with a wireless carrier network of claim 8, wherein:
providing the wireless device with access to a download comprises directing the wireless device to a download location for the mobile application on a mobile application database operated by a third party.

14. The non-transitory computer-readable medium having instructions embedded thereon for provisioning a wireless device for use with a wireless carrier network of claim 13, wherein:
directing the wireless device to the download location comprises communicating a message to the wireless device, via the wireless carrier network, the message including instructions to open a browser of the wireless device to the download location.

15. A system for provisioning a wireless device for use with a wireless carrier, the system comprising:
a communications interface configured to communicate with a wireless carrier network;
a memory; and
one or more processors configured to:
receive, using the communications interface, an initial provisioning request, the initial provisioning request comprising an identifier associated with the wireless device, wherein the wireless device is not yet authorized for use on the wireless carrier network beyond provisioning of the wireless device;
determine, prior to the wireless device being provisioned, that the wireless device is data-ready, wherein data-ready wireless devices are configured to download and execute mobile applications;
provide, prior to the wireless device being provisioned, using the communications interface, the wireless device with access to a download for a mobile application, wherein the mobile application is configured to provision the wireless device over the wireless carrier network when installed and executed by the wireless device;
receive, via the wireless carrier network, prior to the wireless device being provisioned, using the communications interface, registration information from the mobile application being executed by the wireless device; and
provide, using the communications interface, the registration information to a provider of the wireless carrier network, the registration information being used for provisioning the wireless device on the wireless carrier network.

16. The system for provisioning a wireless device for use with a wireless carrier of claim 15, wherein the processor is further configured to:
provide, prior to the wireless device being provisioned, the wireless device with access to a download for a set of additional mobile applications, wherein the set of additional mobile applications is selected by a provider of the wireless carrier network.

17. The system for provisioning a wireless device for use with a wireless carrier of claim 16, wherein:
providing the wireless device with access to a download for a set of additional mobile applications comprises directing a browser of the wireless device to a website having a link to a download source for the set of additional mobile applications.

18. The system for provisioning a wireless device for use with a wireless carrier of claim 17, wherein:
the website includes a link to a download source for the mobile application.

19. The system for provisioning a wireless device for use with a wireless carrier of claim 16, wherein:
providing the wireless device with access to a download for a set of additional mobile applications comprises one or more of pushing a download of the mobile application to the wireless device, directing a browser of the wireless device to a website having a link to a download source for the mobile application, or directing the wireless device to a download location for the mobile application on a mobile application database operated by a third party after the wireless device has been provisioned on the wireless carrier network.

20. The system for provisioning a wireless device for use with a wireless carrier of claim 15, wherein the processor is further configured to:
detect, prior to the wireless device being provisioned, an operating system of the wireless device, wherein a manner of providing the wireless device with access to a download for a mobile carrier application is selected based on the detected operating system.

\* \* \* \* \*